(No Model.)
I. W. BAILEY.
Drying Apparatus.
No. 241,588. Patented May 17, 1881.
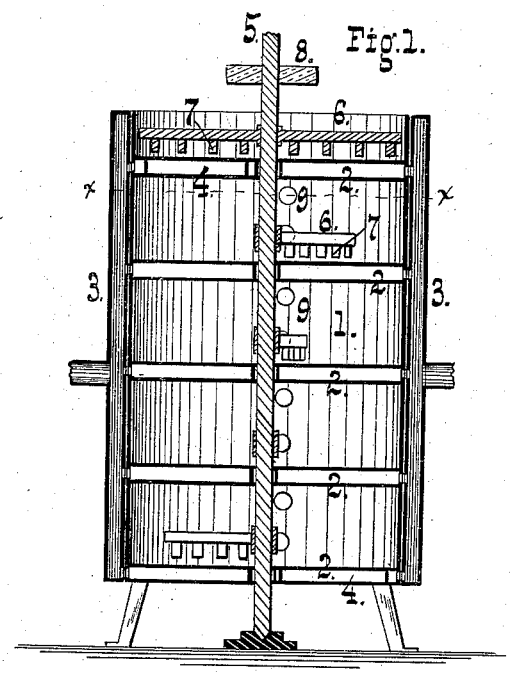
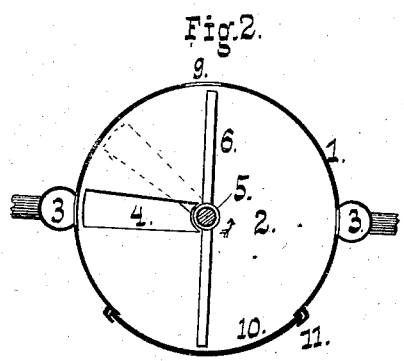
WITNESSES.
INVENTOR
I. W. Bailey
BY
ATTORNEY.

United States Patent Office.

ISAAC W. BAILEY, OF FAIRPORT, VIRGINIA.

DRYING APPARATUS.

SPECIFICATION forming part of Letters Patent No. 241,588, dated May 17, 1881.

Application filed March 3, 1881. (No model.)

*To all whom it may concern:*

Be it known that I, ISAAC W. BAILEY, of Fairport, Northumberland county, State of Virginia, have invented certain new and useful Improvements in Drying Apparatus; and I hereby declare the same to be fully, clearly, and exactly described as follows, reference being had to the accompanying drawings, in which—

Figure 1 is a central vertical sectional view of the device, and Fig. 2 is a transverse sectional view on the line x x of Fig. 1.

My invention has reference to apparatus for drying various substances, such as fruit or grain; but it is more especially designed for the drying of fish used in the manufacture of fertilizers. For this purpose it is essential that the fish be very thoroughly dried, as otherwise the comminution, preparatory to mixing them with other materials, to constitute the fertilizers, is quite difficult.

I have devised a drier, consisting of a number of hollow partitions, adapted to be heated by steam or air led through their interior, and mounted, one above the other, in a suitable casing, in which is journaled a shaft that carries a number of stirrers. These latter are so arranged that the fish, being fed in at the top, are caused to descend through the casing, and in contact with the hot plates or partitions, whereby they are thoroughly dried, and are received at the bottom in a condition suitable for grinding and mixing with bones, phosphates, or other fertilizing materials.

In the drawings, 1 is the casing, having a number of hollow partitions, 2, secured to its inner walls. Steam-pipes 3 communicate with the interior of the partitions 2, leading from a suitable boiler, and also passing, if desired, in transit from the boiler to the casing, through a superheating-coil or equivalent device. The partitions 2 are perforated, as shown at 4, which perforations are so arranged that the material which drops through them falls upon the next plate or partition below at a point just in advance of its perforation. A shaft, 5, passes centrally through the casing 1, and carries a number of horizontal shafts, 6, provided with depending teeth or stirrers 7, that pass in close contiguity to the partition below. The shaft 5 carries a pulley, 8, for the attachment of the driving-belt. The casing 1 is perforated, as at 9, between each pair of partitions, so as to allow free egress for the vapor driven off from the fish, and one side, 10, of the casing is made removable, in order to gain access to its interior to clean it. The side 10 is, by preference, made to slide vertically in guides 11, or it may be hinged to the casing.

In operation, steam being supplied to the hollow partitions, the shaft 5 is caused to revolve in the direction of the arrow, and the fish are fed in at the top of the device. The shaft 6 sweeps the material around upon the partition until it comes opposite the aperture 4, through which it falls upon the next partition below, and at a point in advance of the aperture therein. Here the material is again swept around over the heated partition, making its complete circuit and falling through its aperture upon the next partition, and so on throughout the whole series. The vapor evolved in transit passes out through the holes 9, through which a blast may be induced, if desired, by means of a suitable blower. It is obvious, as before indicated, that the device may be used for drying other material than fish, the mode of operation in any case being the same.

Having thus described my invention, what I claim is—

1. In combination with the casing 1, having perforations 9, and central shaft and stirrers, the hollow perforated partitions and steam-pipes 3, as set forth.

2. In combination with the casing 1, having removable side 10, and perforations 9, the central revolving shaft and stirrers, the steam-pipes 3, and hollow partitions 2, having each an aperture, 4, located in advance of that in the next partition below, as set forth.

ISAAC W. BAILEY.

Witnesses:
 R. D. WILLIAMS,
 W. A. BERTRAM.